(12) United States Patent
Belghoul et al.

(10) Patent No.: US 10,470,050 B2
(45) Date of Patent: Nov. 5, 2019

(54) LICENSE ASSISTED ACCESS UPLINK COMMUNICATION WITH WI-FI PREAMBLE

(71) Applicant: Apple Inc., Cupertino, CA (US)

(72) Inventors: Farouk Belghoul, Campbell, CA (US); Christian W. Mucke, Cupertino, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 163 days.

(21) Appl. No.: 15/812,193

(22) Filed: Nov. 14, 2017

(65) Prior Publication Data

US 2018/0139617 A1 May 17, 2018

Related U.S. Application Data

(60) Provisional application No. 62/423,010, filed on Nov. 16, 2016.

(51) Int. Cl.
*H04W 16/14* (2009.01)
*H04W 74/08* (2009.01)
*H04W 24/10* (2009.01)
*H04W 84/12* (2009.01)

(52) U.S. Cl.
CPC ....... *H04W 16/14* (2013.01); *H04W 74/0808* (2013.01); *H04W 24/10* (2013.01); *H04W 84/12* (2013.01)

(58) Field of Classification Search
CPC .. H04W 16/14; H04W 24/10; H04W 74/0808
See application file for complete search history.

(56) References Cited

U.S. PATENT DOCUMENTS

| 9,602,313 B1 * | 3/2017 | Jalloul ................. H04L 25/021 |
| 2016/0212764 A1 | 7/2016 | Yin et al. |
| 2017/0006640 A1 | 1/2017 | Dinan |
| 2017/0019909 A1 | 1/2017 | Si et al. |
| 2017/0135128 A1 | 5/2017 | Yerramalli et al. |
| 2017/0290059 A1 * | 10/2017 | Karaki ............. H04W 74/0816 |
| 2019/0053273 A1 * | 2/2019 | Kim ...................... H04W 24/10 |

* cited by examiner

*Primary Examiner* — Kevin C. Harper
*Assistant Examiner* — Henry Baron
(74) *Attorney, Agent, or Firm* — Meyertons Hood Kivlin Kowert and Goetzel PC; Jeffrey C. Hood

(57) ABSTRACT

This disclosure relates to performing uplink cellular communication in unlicensed frequency bands using Wi-Fi preamble information. A wireless device may receive downlink control information from a cellular base station. The downlink control information may indicate an uplink transmit opportunity for licensed assisted access communication for the wireless device. A length of the uplink transmit opportunity may be determined. Licensed assisted access uplink communication may be performed during the uplink transmit opportunity. A Wi-Fi physical layer preamble may be transmitted as part of the licensed assisted access uplink communication. A type of the Wi-Fi physical layer preamble may depend at least in part on the length of the uplink transmit opportunity.

20 Claims, 14 Drawing Sheets

LICENSE ASSISTED ACCESS UPLINK COMMUNICATION WITH WI-FI PREAMBLE

PRIORITY INFORMATION

This application claims priority to U.S. provisional patent application Ser. No. 62/423,010, entitled "License Assisted Access Uplink Communication with Wi-Fi Preamble," filed Nov. 16, 2016, which is hereby incorporated by reference in its entirety as though fully and completely set forth herein.

FIELD

The present application relates to wireless communications, and more particularly to systems, apparatuses, and methods for performing uplink LAA communication with Wi-Fi preamble information.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH', etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

In addition to the communication standards mentioned above, there also exist extensions aimed at boosting transmission coverage in certain cellular networks. For example, LTE in Unlicensed spectrum (LTE-U) allows cellular carriers to boost coverage in their cellular networks by transmitting in the unlicensed 5 GHz band, which is also used by many Wi-Fi devices. Licensed Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. However, the coexistence of cellular and Wi-Fi communications in the same band can still result in the degradation of data throughput and/or decreased performance of streaming applications (data streaming) when both Wi-Fi signals and LAA/LTE-U signals are present.

SUMMARY

Embodiments are presented herein of apparatuses, systems, and methods for performing cellular uplink communication in an unlicensed frequency band (e.g., LAA/LTE-U communication) using a Wi-Fi physical layer preamble.

According to at least some aspects of this disclosure, when a wireless device is granted an uplink transmit opportunity in an unlicensed frequency band, the device may perform a LBT procedure to determine whether the medium on which the uplink transmit opportunity is granted is available. The LBT procedure may include energy detection (e.g., in order to determine the likelihood that a transmission is currently occurring) and/or Wi-Fi physical layer preamble detection. If a Wi-Fi physical layer preamble is detected during the LBT procedure, the wireless device may suspend the LBT procedure for the duration of the medium reservation indicated by the Wi-Fi physical layer preamble. The wireless device may enter a lower power (e.g., sleep) mode for this time period. If there is transmit opportunity remaining after the medium reservation ends, the LBT procedure may be resumed.

Once the LBT procedure completes, the wireless device may make use of the remaining transmit opportunity to perform uplink communication. As part of the uplink communication, the wireless device may itself transmit a Wi-Fi physical layer preamble indicating a length for which the medium is reserved for the uplink communication by the wireless device.

The wireless device may select a type of Wi-Fi physical layer preamble to include based on the length of the transmit opportunity, in some embodiments. For example, one type of preamble might be used for medium reservation lengths less than a certain length threshold, while another type of preamble might be used for medium reservation lengths greater than the certain length threshold.

Such use of Wi-Fi physical layer preambles in conjunction with uplink LAA communication may result in lower power consumption by communication devices in the system. For example, a device that is able to determine that a wireless medium is busy based on a Wi-Fi preamble may be able to reduce its power consumption until the end of the medium reservation length indicated by the Wi-Fi preamble. In comparison, a device that determines that a wireless medium is busy based on energy detection alone may continuously monitor the medium until the energy detection indicates that the medium has come available, potentially resulting in greater power consumption, at least in some instances.

Further, such use of Wi-Fi physical layer preambles may benefit devices performing measurements that might otherwise be susceptible to inaccuracy induced by hidden nodes. For example, a cellular base station that tasks a wireless device to perform radio resource management (RRM) measurements during a certain window may have performed a LBT procedure to determine that the medium would be free when the RRM measurements were occurring, but if the wireless device is within range of another device that is 'hidden' to the base station, and that other device is occupying the medium, that could potentially result in inaccurate RRM measurements. If the wireless device can detect that the other device has transmitted a Wi-Fi preamble, the wireless device may be able to avoid performing the RRM measurements while the other device is occupying the medium, and may instead perform the RRM measurements during windows when the wireless medium is not otherwise occupied.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
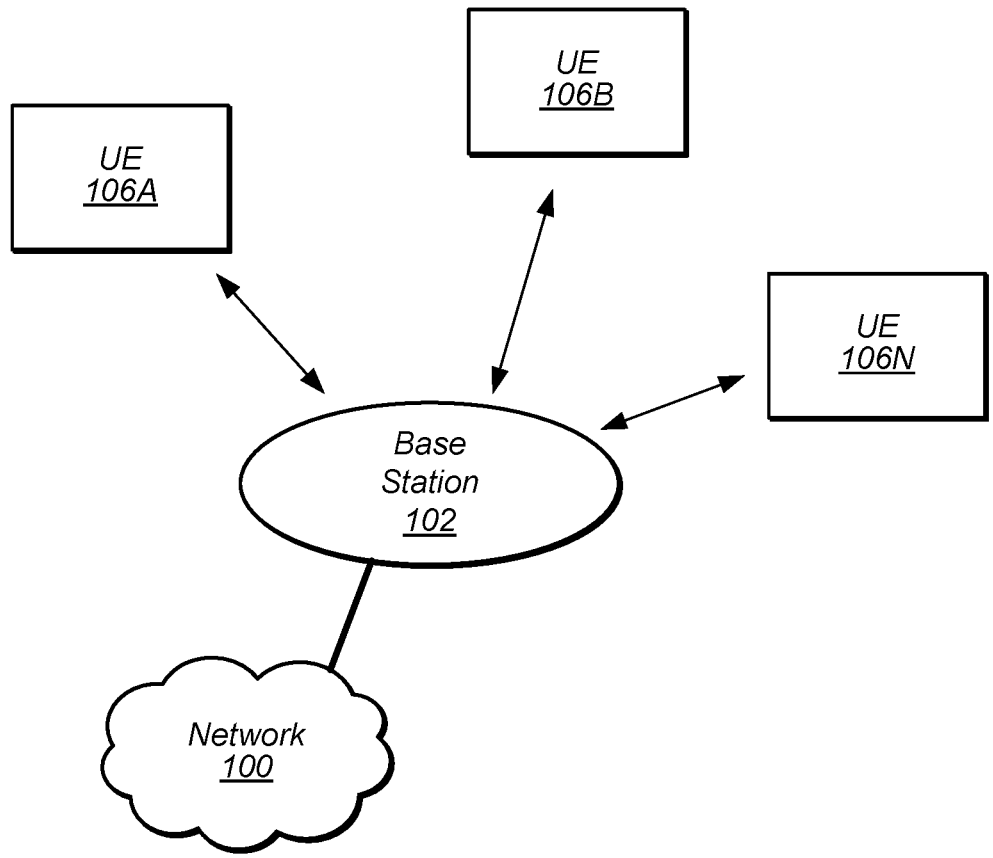
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
LTE-U: LTE-Unlicensed
LAA: Licensed Assisted Access
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
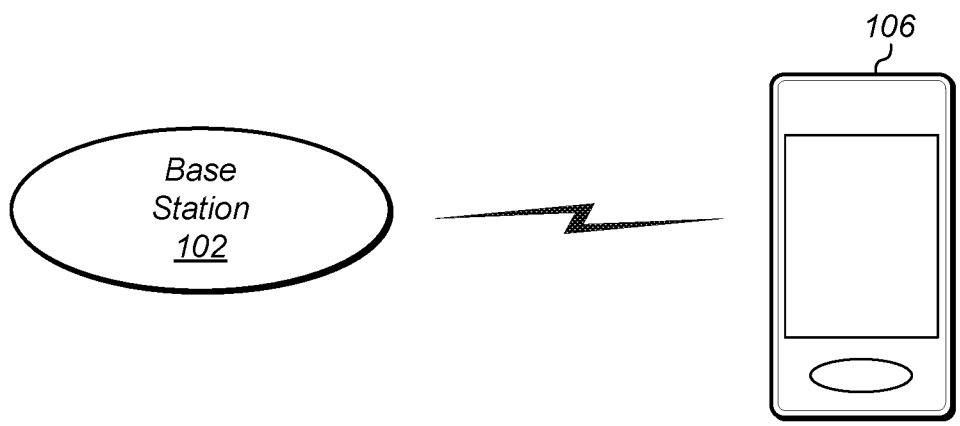
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, NR, 3GPP2 CDMA2000 (e.g., 1×RTT, 1×EV-DO, HRPD, eHRPD), Wi-Fi, WiMAX etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to perform LAA/LTE-U uplink communication in a manner that includes transmission of a Wi-Fi physical layer preamble, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a handheld device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM, or LTE or NR), and separate radios for communicating using each of Wi-Fi and BLUETOOTH'. Other configurations are also possible.

Figure 3:
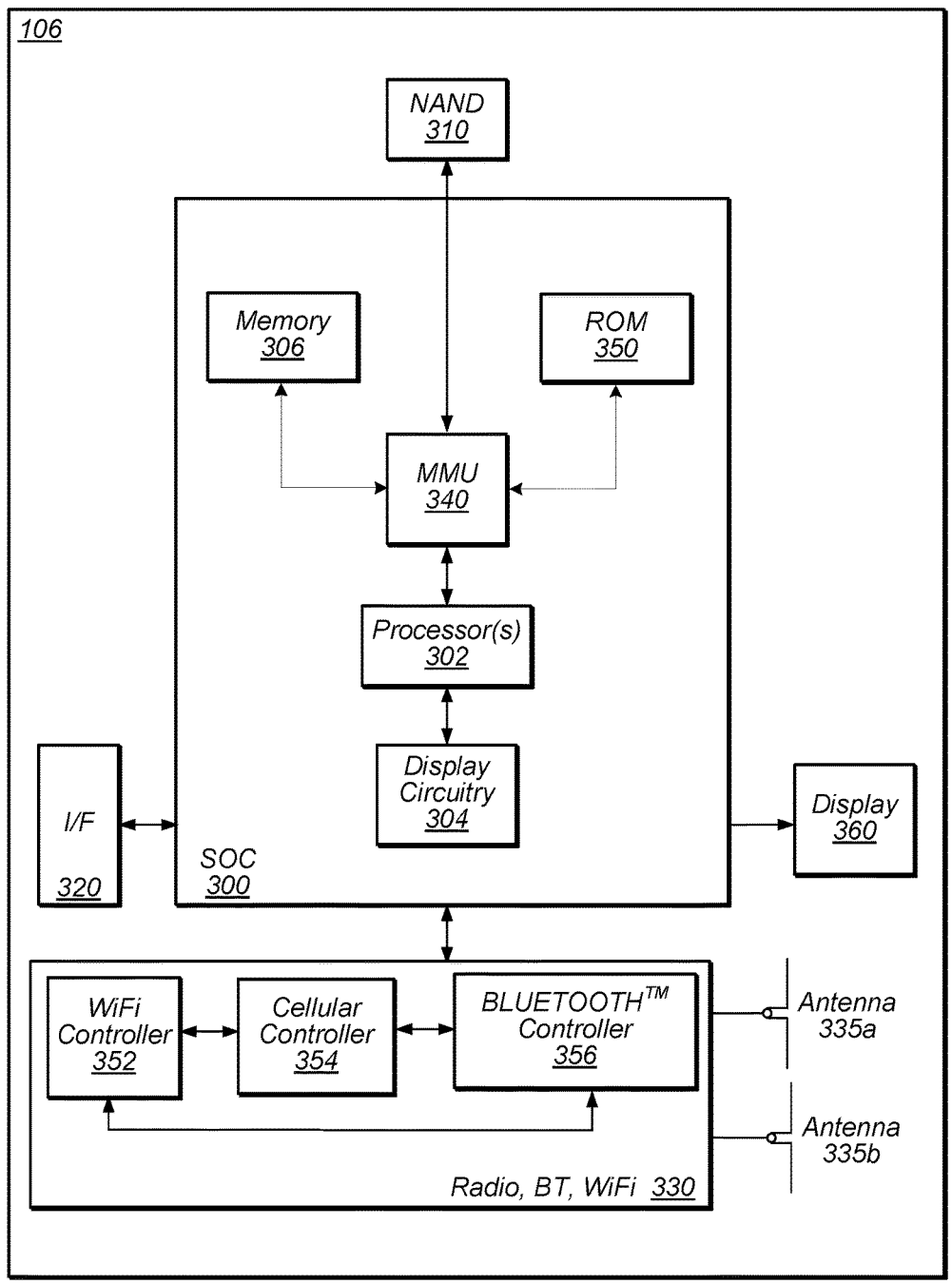
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH', Wi-Fi, NFC, GPS, etc.).

The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to perform LAA/LTE-U uplink communication in a manner that includes transmission of a Wi-Fi physical layer preamble. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement LAA/LTE-U uplink communications by UE 106 that include transmission of a Wi-Fi physical layer preamble according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE controller) 354, and BLU-ETOOTH' controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLU-ETOOTH' controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible LAA communication by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
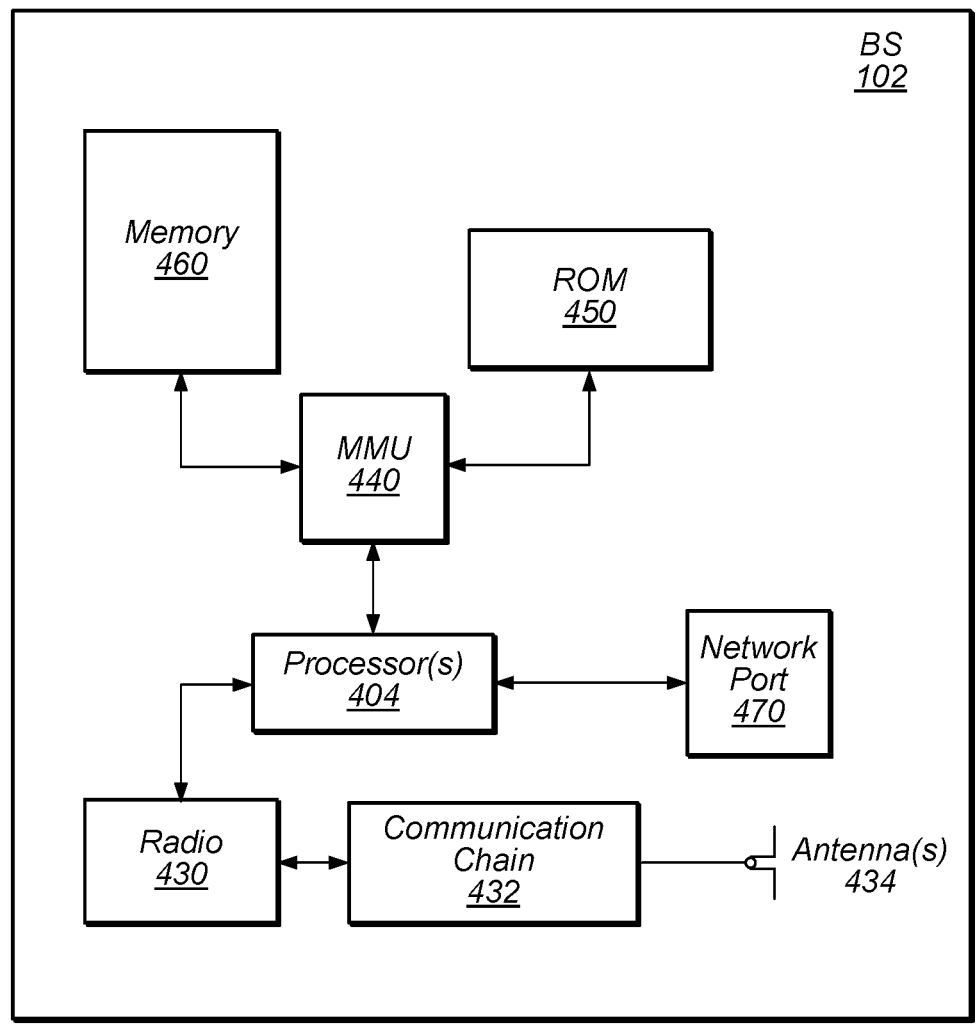
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, NR, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard. Base station 102 may operate according to the various methods as disclosed herein for wireless devices to perform LAA/LTE-U uplink communication in a manner that includes transmission of a Wi-Fi physical layer preamble.

Figure 5:
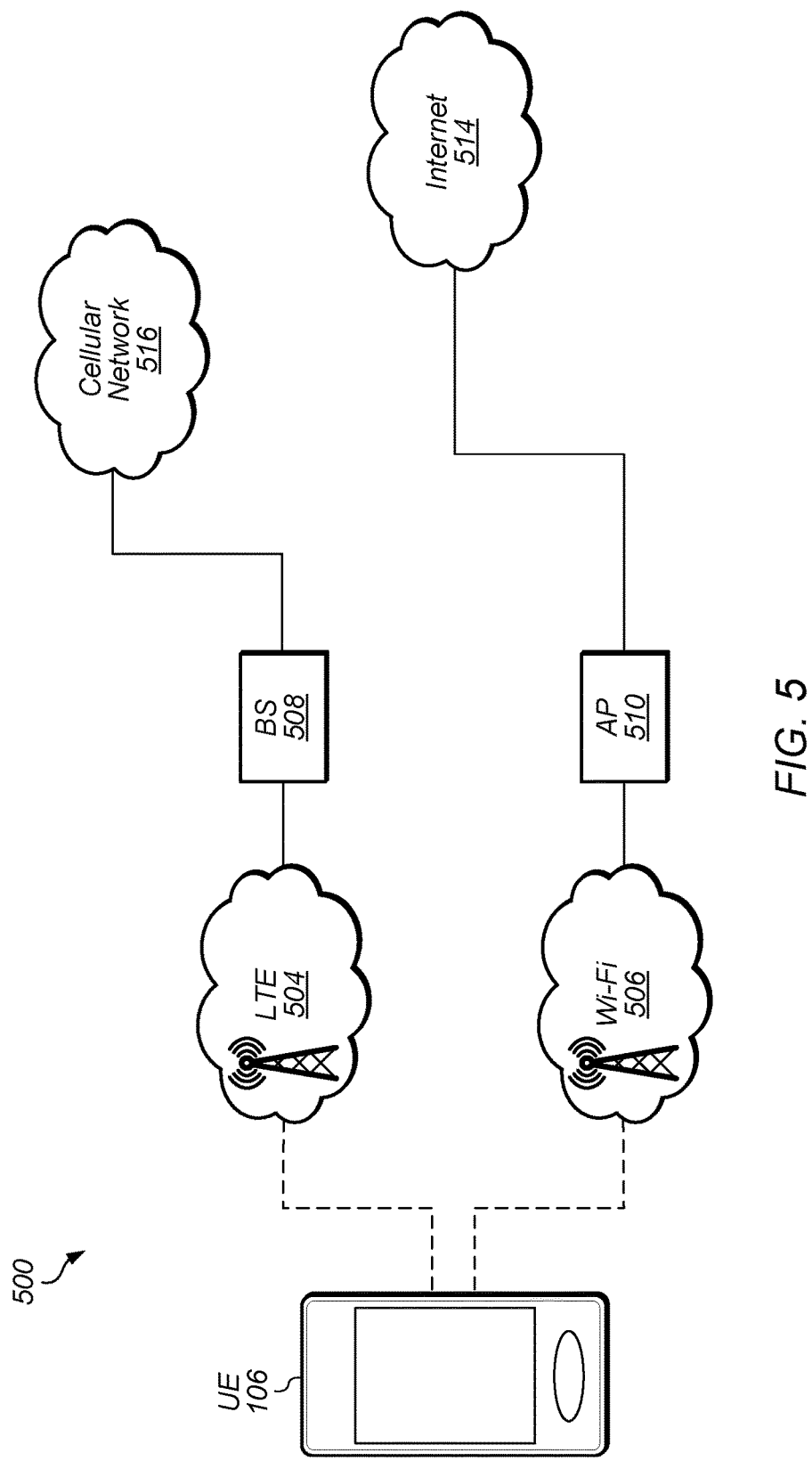
FIG. 5 illustrates an exemplary wireless communication system, according to some embodiments.

FIG. 5—Exemplary Communication System

FIG. 5 illustrates an exemplary wireless communication system 500 in which aspects of the present disclosure may be implemented, according to some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g., LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP), which may in turn provide access to the Internet 514. UE 106 may accordingly access Internet 514 via AP 510 and cellular network 516 via LTE access network 504. In some embodiments, though not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
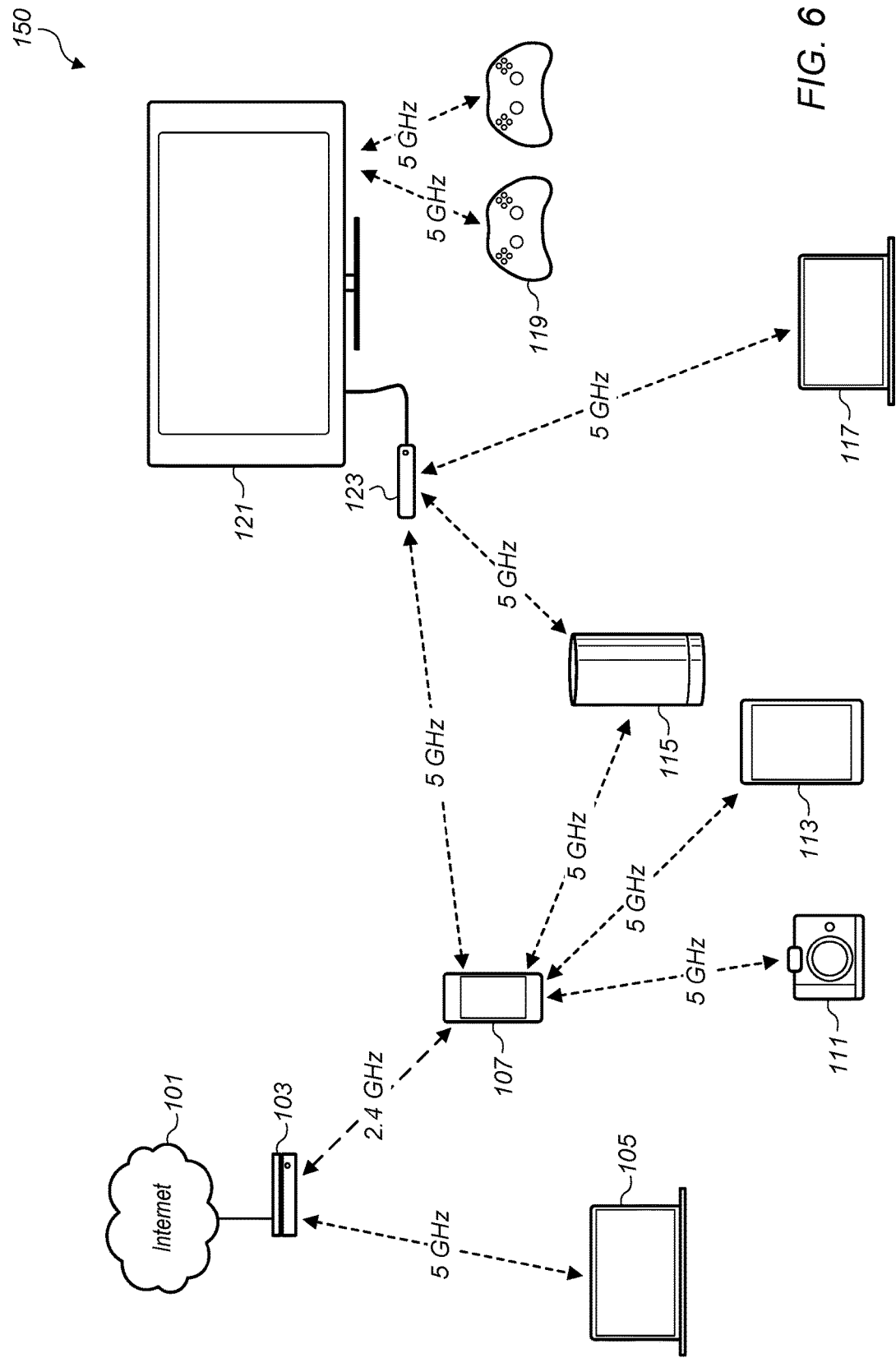
FIG. 6 illustrates an exemplary communication system in which multiple different devices may communicate with each other over specific band, such as 2.4 GHz and/or 5 GHz frequency bands using Wi-Fi, according to some embodiments.

FIG. 6—Exemplary Communication System with Multiple Wi-Fi Devices

FIG. 6 shows an exemplary communication system in which multiple different devices may communicate with each other over a specific band, such as 2.4 GHz and/or 5 GHz frequency bands using Wi-Fi RAT. 5 GHz Wi-Fi (e.g., IEEE 802.11 ac/n) capable devices have become quite common, operating in both peer-to-peer mode and/or infrastructure/station mode, as shown in FIG. 6. Data communications over a specific frequency band, e.g., over the 5 GHz band, may include Voice, Video, real time and best effort type of traffic. Illustrated devices include cameras (111), tablets (113), speakers (115), portable computers (105, 117), access ports/routers (103), game controllers (119), mobile devices such as smart phones (107), and smart monitors (121) or monitors with wireless access interface (121 together with media processing devices 123). As shown in FIG. 6, many of the devices may communicate over the 5 GHz band, using Wi-Fi communication technology. In some cases the Wi-Fi communications conducted by the devices may affect and/or be affected by LAA/LTE-U communications also taking place over the 5 GHz band.

Figure 7:
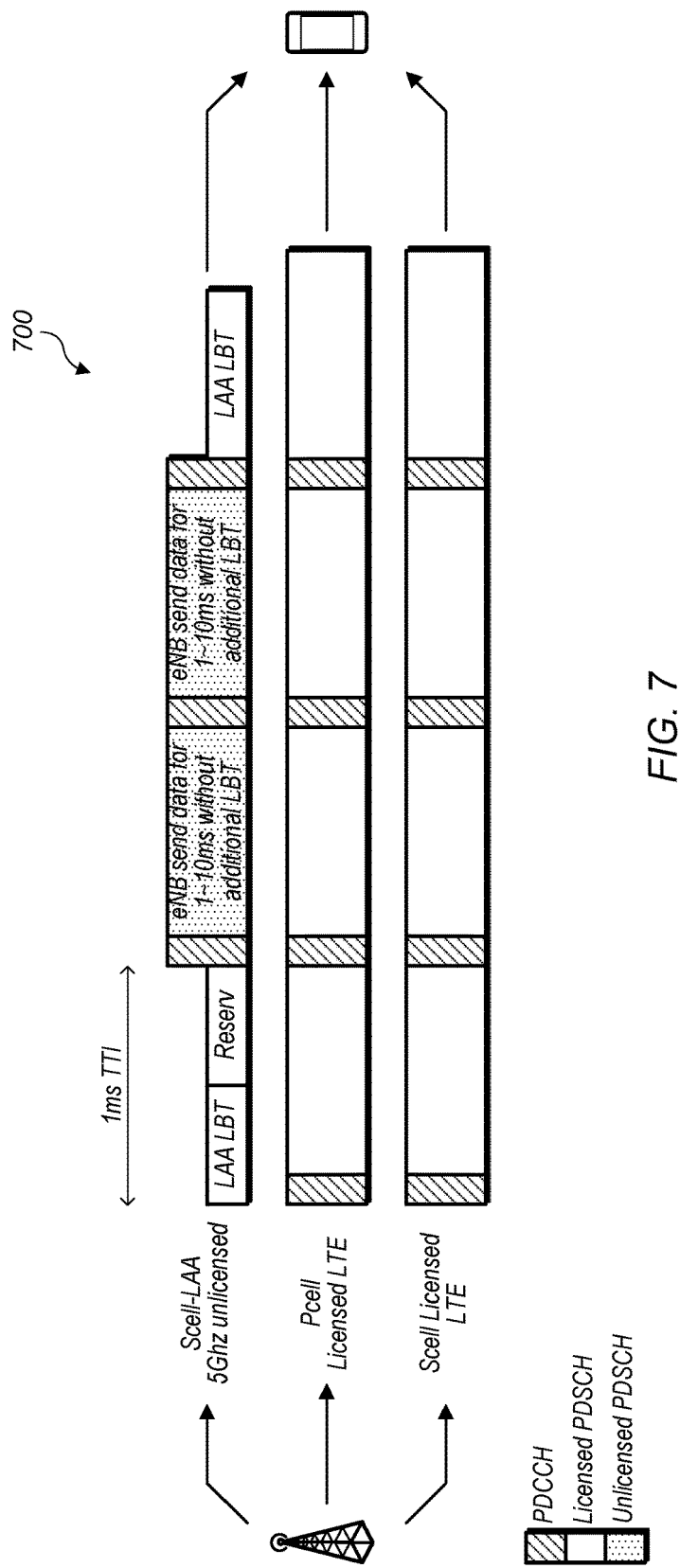
FIGS. 7-8 illustrate exemplary aspects of LAA communication, according to some embodiments.
Figure 8:
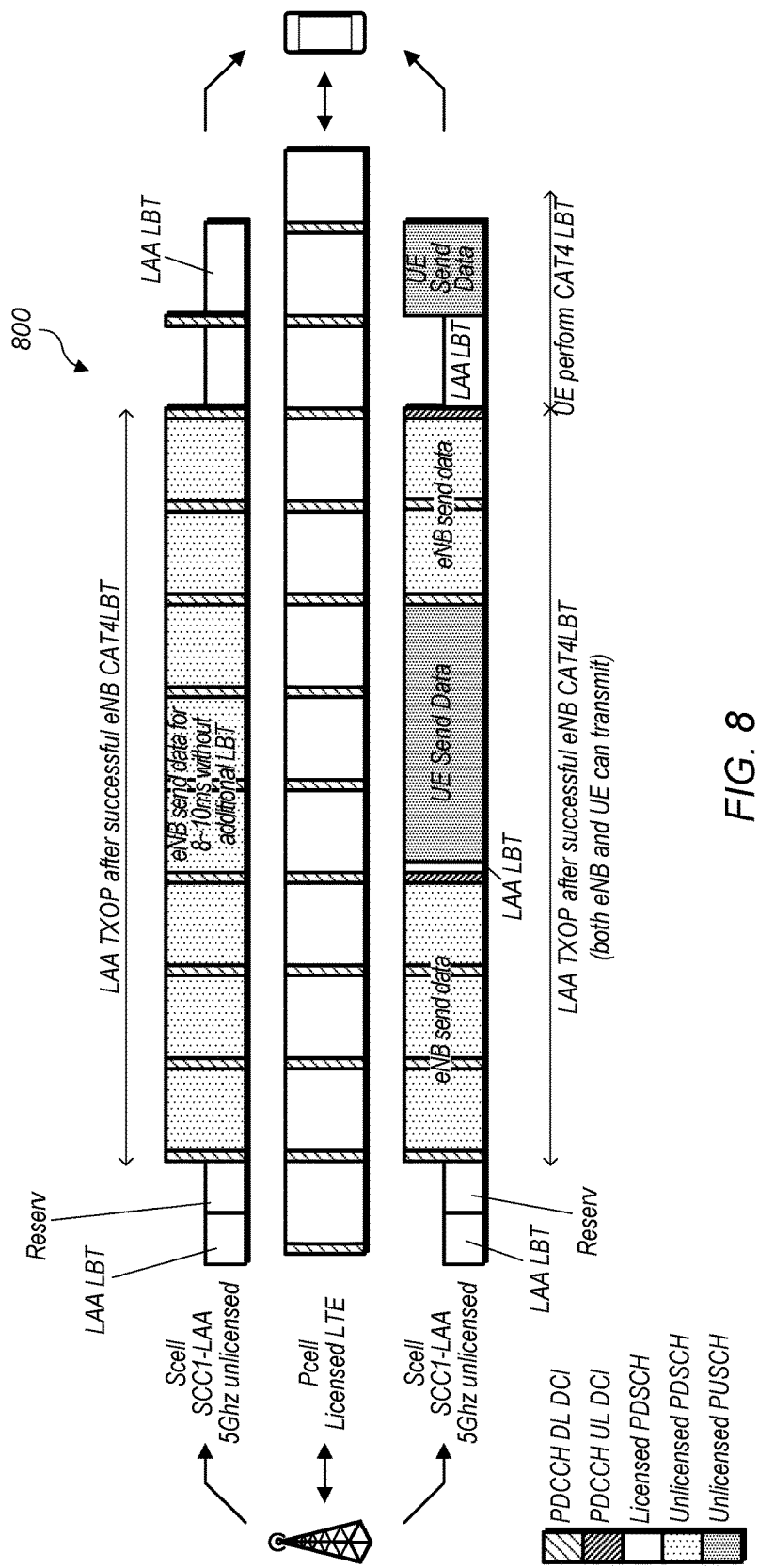

FIGS. 7-8—LAA Structure Summary

In LTE, carrier aggregation (CA) refers to two or more component carriers (CCs) being aggregated in order to support wider transmission bandwidths, e.g. bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (Pcell), and Secondary Cells (Scells) together with the PCell may form a set of serving cells. In CA, a UE may be scheduled via the physical downlink control channel (PDCCH) over multiple serving cells simultaneously. Cross-carrier scheduling, e.g., using a Carrier Indicator Field (CIF), may allow the PDCCH of a serving cell to schedule resources on another serving cell. That is, a UE receiving a downlink assignment on one CC may receive associated data on another CC.

LAA is a sub-category of LTE inter-band carrier aggregation, in which one of the secondary carriers is operating in a 5 GHz unlicensed band, a band over which communications according to another RAT, such as Wi-Fi, may also be taking place. Resources in an LAA carrier may be scheduled in the same manner that resources are scheduled in legacy CA. That is, same carrier scheduling and/or cross layer scheduling may be used for scheduling LAA carriers, e.g., using the PDCCH or ePDCCH. An LAA Scell may operate in a frame structure 3 composed of 20 slots and may be accessed following a successful listen-before-talk (LBT) procedure.

Note that (e.g., depending on the applicable standard version and/or implementation choices), LAA may be used for downlink communication and/or uplink communication. For example, according to some embodiments, LAA release 13 may include standard specification details for using a SCell for downlink transmissions, while LAA release 14 may include standard specification details for using a SCell for both downlink and uplink transmissions.

FIG. 7 shows an example of possible LAA control and data scheduling in an example Release 13 scenario 700. As shown, an eNB may communicate with a wireless device using three CCs in the example scenario of FIG. 7. The CCs may include a Pcell and one Scell that operate in licensed LTE spectrum, as well as one LAA Scell that operates in unlicensed 5 GHz spectrum. The eNB may make use of an LBT procedure and (e.g., if needed) a reservation signal prior to performing 1-10 ms of communication on the LAA Scell. A further LBT procedure may again be performed prior to performing additional downlink communication on the LAA Scell.

FIG. 8 shows an example of possible LAA control and data scheduling in an example Release 14 scenario 800. As shown, an eNB may also communicate with a wireless device using three CCs in the example scenario of FIG. 8. The CCs may in this example include a Pcell that operates in licensed LTE spectrum and two Scells that operate in unlicensed 5 GHz spectrum. The eNB may make use of an LBT procedure and (e.g., if needed) a reservation signal prior to performing 1-10 ms of communication on each of the LAA Scells. The eNB may be able to provide some portion of the LAA Scell resources for uplink transmit opportunities. For example, as shown, the eNB may provide an indication of an uplink transmit opportunity (TXOP) to the wireless device during its reserved LAA TXOP via downlink control information (DCI) sent on the PDCCH, based on which the wireless device may perform its own LBT procedure and send uplink data on the LAA Scell.

Figure 9:
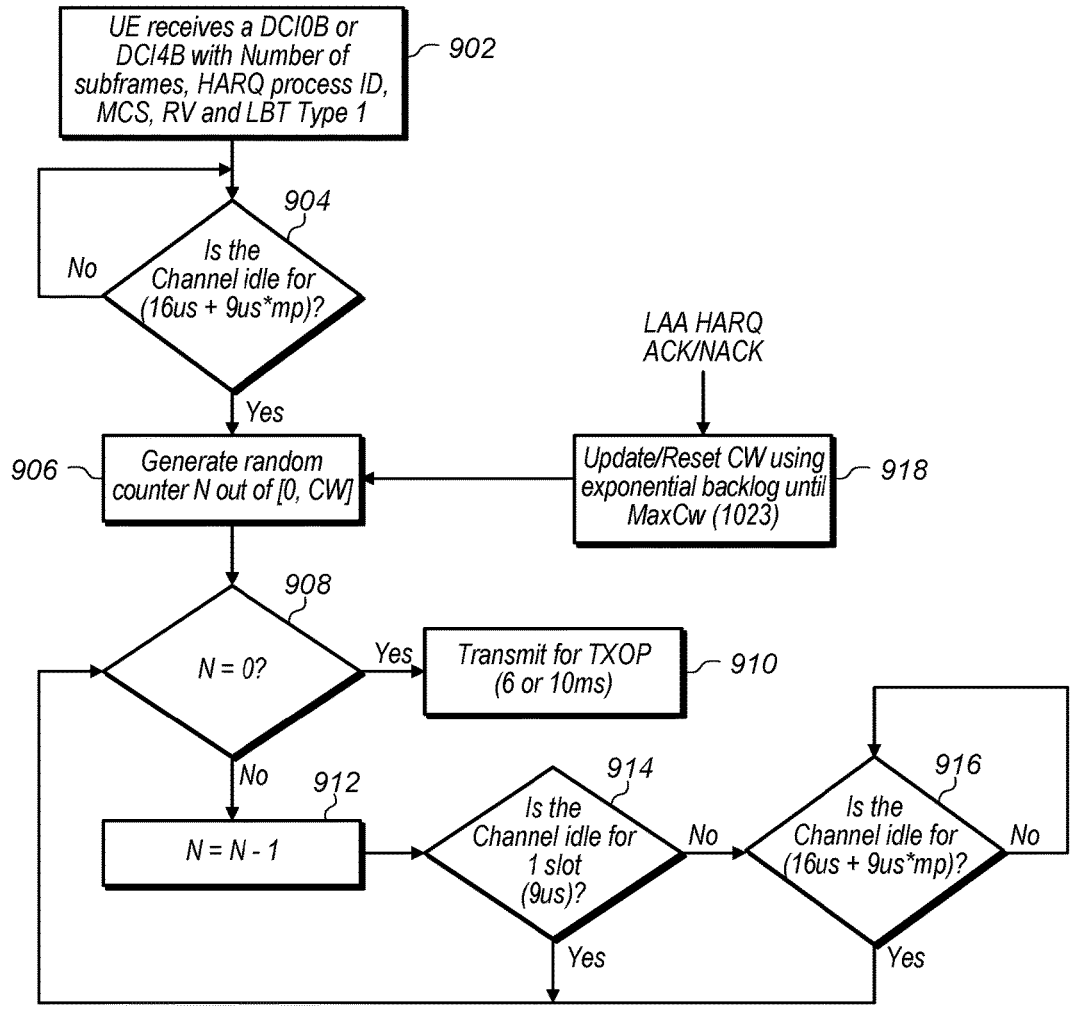
FIG. 9 is a flowchart diagram illustrating aspects of an exemplary possible uplink LBT procedure, according to some embodiments.

FIG. 9—LBT Procedure

FIG. 9 shows an exemplary flowchart for a LBT procedure. Note that while the process shown in FIG. 9 represents one possible LBT procedure, any number of variations on or alternatives to the procedure of FIG. 9 are also possible. For example, while the LBT procedure of FIG. 9 is directed to a UE device performing an LBT procedure, a base station (e.g., eNB) may also or alternatively perform an LBT procedure in certain circumstances. In general, a LBT procedure may be used to help avoid causing collisions on a shared wireless medium, by monitoring the wireless medium to determine if any transmissions are already ongoing, and refraining from transmitting if a transmission is determined to already be in progress.

As shown, in 902, initially a UE device may receive downlink control information indicating an uplink transmit opportunity for the UE device. For example, the UE device may receive a DCI0B or DCI4B indicating configuration information for the uplink TXOP, such as information indicating a number of subframes, a hybrid automatic repeat request (HARQ) process ID, a modulation and coding scheme, redundancy version information, LBT procedure type, etc. The UE may determine that to perform a LBT procedure based on the configuration information and/or based on the uplink TXOP being for a shared wireless medium (e.g., the 5 GHz unlicensed band, as one possibility).

In 904, the UE may monitor the wireless medium for availability, to determine whether the channel is idle for a predetermined period of time continuously. The length of time may depend on a type (e.g., priority level) of traffic to be transmitted. For example, different lengths of time may be used for some or all of voice, video, best effort, and background traffic, according to some embodiments. In the exemplary illustrated scenario of FIG. 9, the period of time may include a base length of 16 microseconds plus a variable length of 9 microseconds multiplied by a factor ("mp") selected based on the traffic type. As an example, the period of time might be 34 μs (e.g., 16+9*2) for voice or video traffic, 43 μs (e.g., 16+9*3) for best effort traffic, or 79 μs (e.g., 16+9*7) for background traffic according to some embodiments. In this example, shorter periods of time are used for higher priority traffic types, which may generally result in such traffic types having faster access to the wireless medium when it is available. Other values (and algorithms for determining values) for the predetermined period of time may also or alternatively be used, as desired.

If the wireless medium is not available for the predetermined period of time continuously (e.g., if the wireless medium is busy or becomes busy before the predetermined period of time expires), the UE may continue to monitor the wireless medium until such a time as the wireless medium does become idle for the predetermined period of time continuously, at which time the method may proceed to step 906.

In 906, the UE may generate a random counter N with a value within a specified contention window (CW) range, e.g., between 0 and a predetermined maximum possible value CW. Note that the method may also proceed to step 906 to perform a LBT procedure from step 918, in which the contention window may be updated or reset using an exponential backog until a maximum contention window, e.g., based on LAA HARQ ACK/NACK information.

In 908, it may be determined if the counter N is equal to 0. If yes, the method may proceed to step 910, in which the UE may proceed to transmit for its transmission opportunity (e.g., 6 or 10 milliseconds, among various possibilities). If the counter N is not equal to 0, the method may proceed to step 912, in which the counter N may be reduced by 1.

In 914, it may be determined if the wireless medium remains idle for 1 Wi-Fi slot (e.g., 9 μs). If no, the method may proceed to step 916, in which the UE may again monitor the wireless medium for availability (e.g., in a similar manner as in step 904), to determine whether the channel is idle for the predetermined period of time continuously. The UE may repeat this step as needed until the channel is idle for the predetermined period of time continuously.

If the result of step 914 or step 916 is yes, the method may return to step 908, in which it may be determined if the counter N is now equal to 0. As previously noted, once the counter N is equal to 0, the method may proceed to step 910, in which the UE may proceed to transmit for its transmission opportunity. Otherwise, the method may repeat its countdown of the counter N when the wireless medium is idle according to the illustrated procedure.

Figure 10:
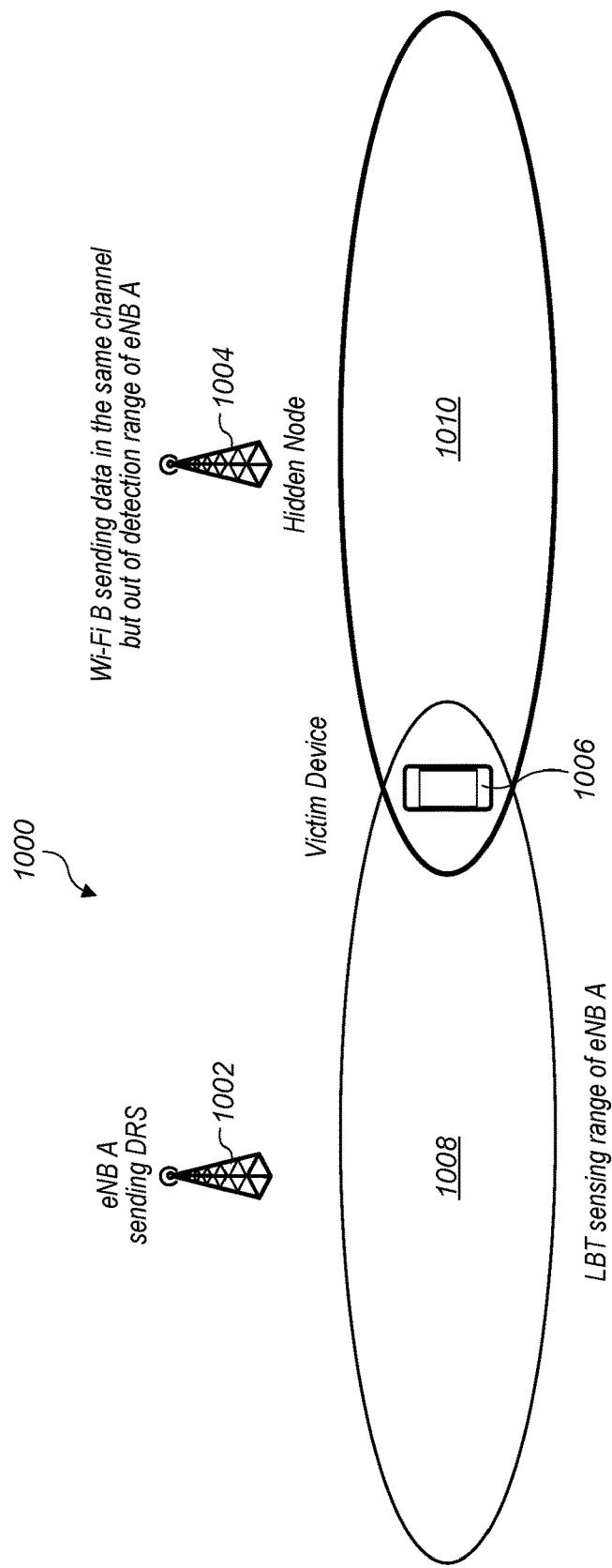
FIG. 10 illustrates an exemplary communication system with a hidden node, according to some embodiments.

FIG. 10—Communication System with a Hidden Node

FIG. 10 illustrates an exemplary possible wireless communication system 1000 in which a hidden node is present. As shown, a UE device 1006 may be within communication range of an eNB ("eNB A") 1002. The UE device 1006 may also be within communication range of a Wi-Fi node ("Wi-Fi B") 1004. However, the Wi-Fi B device 1004 may not be within communication range of the eNB A 1002.

In such a scenario, e.g., in which Wi-Fi B 1004 is a hidden node to eNB A 1002 (and vice versa), it may be possible for a collision in the wireless medium to occur if, for example, the UE 1006 receives an indication of an uplink transmit opportunity from the eNB A 1002 and relies on an LBT procedure performed by the eNB A 1002 to have determined that the medium is available while Wi-Fi B is communicating data with another Wi-Fi node. This may in turn result in the UE 1006 causing interference to the recipient of the communication by Wi-Fi B 1004, potentially resulting in unsuccessful decoding of one or more transmissions on the wireless medium, effectively wasting power and wireless medium resources.

Scenarios such as this, and variations thereon, may be illustrative of what is commonly referred to as the "hidden node problem". The hidden node problem may occur both when the wireless medium is used homogenously (e.g., by devices all using the same communication technology) and when the wireless medium experiences mixed us (e.g., by devices using multiple different communication technologies). For example, the illustrated wireless communication system 1000 may represent a system in which the wireless medium used includes mixed unlicensed spectrum.

A further potential problem that could occur in the illustrated scenario of FIG. 10, and more generally when the hidden node problem occurs, relates to the accuracy of measurements performed on the wireless medium and used to perform radio resource management for the wireless medium. In LAA communication, discovery reference signals (DRS) may be used by UEs for synchronization and measurements. The DRS may be transmitted any time within a periodically occurring time window that may be referred to as a DRS measurement timing configuration (DMTC) period. As one possibility, the DMTC period may be 6 ms in duration with an occurrence every 40, 80, or 160 ms; other configurations are also possible. The DRS may be cell-specific reference signals (CRS) or channel state information reference signals (CSI-RS), among various possibilities. The DRS measurements may be reported to the base station serving the UE as RSRP/RSRQ measurements, and may serve as radio resource management (RRM) measurements for the serving base station.

In LAA communication scenarios, an eNB may perform a LBT procedure to ensure that the medium is free, from its perspective, during the DMTC occasions that it configures. However, if a hidden node such as illustrated in FIG. 10 is present, the eNB LBT procedure may not sense the potentially interfering hidden node, and so RRM measurements could be performed by the UE that are subject to interference from this hidden node. This may in turn negatively impact the performance of the LAA communication.

One way to potentially mitigate such problems that could occur due to undetected hidden nodes may include implementing capabilities for sensing and transmitting Wi-Fi physical layer preambles at LAA capable UE devices. For example, if the UE 1006 were to transmit a Wi-Fi physical layer preamble as part of its transmit opportunity granted by the eNB 1002, this may help prevent collisions on the medium. Further, if the UE 1006 were to perform Wi-Fi preamble detection, the UE 1006 may be able to determine (e.g., with more capability to distinguish transmissions from noise than when performing energy sensing) when a node that is hidden to the eNB A 1002 is transmitting during a DMTC occasion, and to refrain from performing RRM measurements during such times. This may result in more accurate RRM measurements and thus to potentially improved LAA communication performance between the UE 1006 and eNB A 1002.

Note that Wi-Fi physical layer preamble messages may, in addition to helping prevent potential collisions and resulting interference, help improve the management of power consumption and clear channel assessment (CCA)/enhanced CCA (eCCA) process. For example, according to some embodiments, Wi-Fi preamble information may include length information. This length information may be used to allow a device that is waiting for the wireless medium to come available to put its RF into a lower power mode (e.g., to sleep) during the duration of the this communication, and to integrate this duration of idle mode into its CCA/eCCA procedure.

Figure 11:
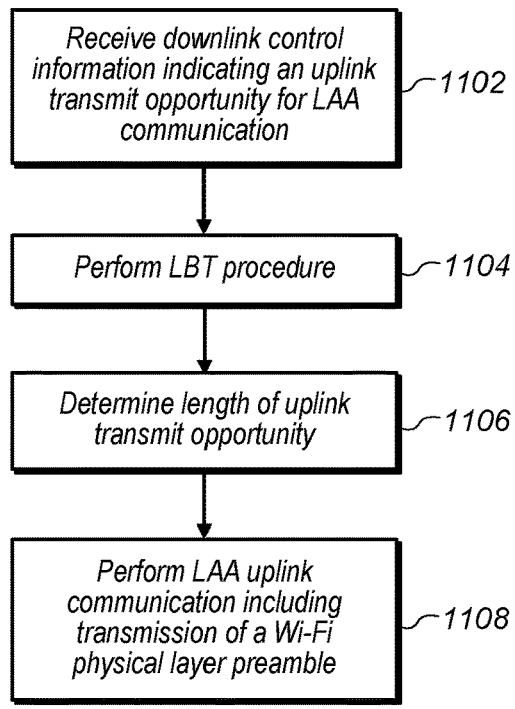
FIGS. 11-12 are flowchart diagrams illustrating exemplary possible methods for performing uplink LAA communication, according to some embodiments.
Figure 12:
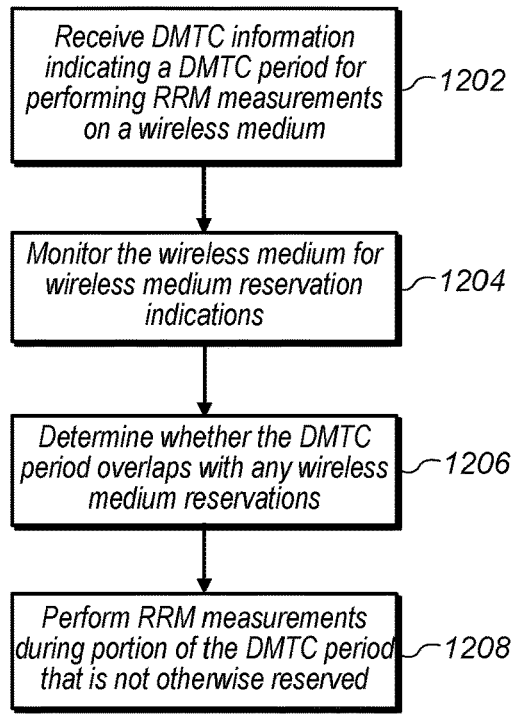

FIGS. 11-12—LAA Uplink Communication with Wi-Fi Physical Layer Preamble

As uplink communication is integrated into LAA, careful consideration is needed regarding how to handle hidden nodes, and more generally for providing features for assisting Wi-Fi nodes sharing the wireless medium to reduce power consumption. As previously discussed, introducing use of Wi-Fi physical layer preamble transmission and sensing for LAA nodes may at least partially help mitigate such concerns. FIGS. 11-12 are flowchart diagrams illustrating methods for a wireless device (e.g., a cellular base station or wireless user equipment (UE) device) to perform LAA uplink communication in a manner that includes transmission and/or sensing of Wi-Fi physical layer preamble, according to some embodiments.

Aspects of the methods of FIGS. 11-12 may be implemented by a wireless device, such as a UE 106 illustrated in and described with respect to various of the Figures herein, or more generally in conjunction with any of the computer systems or devices shown in the above Figures, among other devices, as desired. Note that while at least some elements of the methods of FIGS. 11-12 are described in a manner relating to the use of communication techniques and/or features associated with LTE and/or 3GPP specification documents, such description is not intended to be limiting to the disclosure, and aspects of the methods of FIGS. 11-12 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 11 may operate as follows.

In 1102, the wireless device may receive downlink control information including scheduling information for the wireless device from a cellular base station. The cellular base station may provide a serving cell (or serving set of cells) for the wireless device. The downlink control information may be provided on a physical downlink control channel, e.g., using the same component carrier for which the downlink control information includes scheduling information or using a different component carrier.

The scheduling information may include an indication of an uplink transmit opportunity for the wireless device for LAA communication. For example, the scheduling information may indicate that a LAA component carrier is available for the wireless device to transmit control signaling and/or data on for up to a specific number of milliseconds, as one possibility. Thus, the specified LAA component carrier may serve as the wireless medium for the uplink transmit opportunity, at least according to some embodiments. The wireless medium/component carrier may be a range of spectrum in an unlicensed frequency band that may be shared for communication according to multiple wireless communication technologies (e.g., Wi-Fi, Bluetooth, etc.), such as the 5 GHz industrial-scientific-medical (ISM) band.

In 1104, the wireless device may perform a listen-before-talk (LBT) procedure, e.g., to determine whether the wireless medium is available. The wireless device may be performing the LBT procedure to ensure the wireless medium is available for the uplink grant for LAA communication, according to some embodiments.

The LBT procedure may operate in a similar manner as illustrated and described previously herein with respect to FIG. 9, or in a similar manner as illustrated and described later herein with respect to FIG. 17, or in another manner, as desired. The LBT procedure may include monitoring the wireless medium to determine if any transmissions are already ongoing, for example by detecting signal strength levels on the wireless medium above a certain threshold and thus considered to be indicative of an ongoing transmission, by detecting cyclic signal patterns associated with preamble/prefix signals intended to indicate the presence of a transmission, and/or other by performing other transmission detection techniques. For example, according to some embodiments, the LBT procedure may include performing energy detection and Wi-Fi physical layer preamble detection on the wireless medium.

The LBT procedure may further include refraining from transmitting if a transmission is determined to already be in progress, and may be used to help reduce the number of collision occurrences on the wireless medium. For example, if a Wi-Fi physical layer (PHY) preamble is detected during the LBT procedure, the wireless device may suspend the LBT procedure (and potentially enter a reduced power state, at least with respect to some device components) for a duration indicated by the detected Wi-Fi PHY preamble, e.g., based on detecting the Wi-Fi PHY preamble. According to some embodiments, the LBT procedure may require the wireless medium to be clear for at least a minimum length of time before being considered successful.

In 1106, the wireless device may determine the length of the uplink transmit opportunity. The determined length may be based at least in part on the downlink control information, which may provide an indication of the granted uplink transmit opportunity. According to some embodiments, determining the length of the uplink transmit opportunity may further account for the length of the LBT procedure. For example, the LBT procedure may take a certain (e.g., potentially variable, depending on whether any transmissions occur to delay successful completion of the LBT procedure) amount of time, which may be subtracted from the initially granted uplink transmit opportunity to determine the length of the remaining uplink transmit opportunity after the LBT procedure.

In 1108 (e.g., once the LBT procedure is successful), the wireless device may utilize the wireless medium to perform LAA uplink communication. Note that according to some embodiments, the LAA uplink communication may adhere to a timing synchronization scheme that bounds possible data communication windows. For example, as previously noted, LTE-LAA communication may include a frame structure in which each frame includes 10 subframes, each in turn including 2 timeslots, for a total of 20 slots in each radio frame. In such a scenario, it may be the case that for synchronization reasons, LAA communication may begin only at slot boundaries (or possibly even only at subframe boundaries), at least according to some embodiments. In such a case, the wireless device may transmit a 'reservation signal' (e.g., a noise signal intended to prevent other devices from seizing the medium) until the next possible communication window. Alternatively, it may be possible for the LAA uplink communication to begin immediately, e.g., based on timing of the downlink control information and LBT procedure being coordinated with the system timing synchronization scheme and/or based on standard specifications permitting uplink LAA communication to occur immediately following a successful LBT procedure.

The LAA uplink communication may include transmitting a Wi-Fi PHY preamble. The LAA uplink communication may further include transmitting data using the PUSCH (and possibly transmitting signaling/control information using the PUCCH, e.g., if using same carrier scheduling) during one or more LAA subframes/timeslots. For example, the Wi-Fi PHY preamble may be transmitted prior to transmitting on the PUSCH and/or PUCCH.

The Wi-Fi PHY preamble may include length information indicating the length of the LAA uplink communication (e.g., the determined uplink transmit opportunity length). This may facilitate detection and improve power consumption efficiency of other devices using the wireless medium, as such devices may potentially be able to determine the length of time for which the medium will be occupied without needing to monitor the wireless medium continuously for that length of time, and may instead be able to enter a reduced power state until the end of the indicated length of time.

According to some embodiments, the type of Wi-Fi PHY preamble transmitted may be selected from multiple possible Wi-Fi PHY preamble types. For example, the Wi-Fi PHY preamble could include a legacy Wi-Fi PHY preamble and/or a high-throughput (HT) Wi-Fi PHY preamble, among various possibilities. This may be useful depending on the determined uplink transmit opportunity length, as different Wi-Fi PHY preamble portions may have different field sizes for indicating transmission length. For example, according to some embodiments, a legacy Wi-Fi PHY preamble may include a 12 bit length field capable of indicating transmission lengths up to 5.46 ms. Thus, in such embodiments, if the uplink transmit opportunity length is less than 5.46 ms, it may be possible to accurately indicate the length of the uplink transmit opportunity using a legacy Wi-Fi PHY preamble. In contrast, according to some embodiments, a HT Wi-Fi PHY preamble may include length field of at least 16 bits and capable of indicating transmission lengths up to 80 ms, but may take longer to transmit than a legacy Wi-Fi PHY preamble (e.g., as a legacy preamble portion may be included in addition to the HT preamble portion), and/or older Wi-Fi devices may not be capable of decoding the HT portion of the preamble. Thus, according to such embodiments, if the uplink transmit opportunity length is greater than 5.46 ms, a HT Wi-Fi PHY preamble may be selected in order to accurately indicate the length of the uplink transmit opportunity.

Thus, by incorporating Wi-Fi PHY preamble detection as part of the LBT procedure of a wireless device, and by incorporating Wi-Fi PHY preamble transmissions as part of LAA uplink communications, overall interference and power consumption by wireless devices using a shared wireless medium may generally be possible, at least according to some embodiments. Additionally or alternatively, incorporating the use of Wi-Fi PHY preamble detection and transmissions in conjunction with LAA communication may also benefit the accuracy of RRM measurements performed for LAA communication. FIG. 12 is a flowchart diagram including further details of such potential benefits to the use of Wi-Fi PHY preamble detection and transmissions in conjunction with LAA communication, according to some embodiments. As shown, the method of FIG. 12 may operate as follows.

In 1202, the wireless device may receive DMTC information indicating a DMTC period for performing RRM measurements on a wireless medium. The DMTC information may be received from a cellular base station. The cellular base station may provide a serving cell (or serving set of cells) for the wireless device.

The wireless medium may be a LAA component carrier in an unlicensed frequency band, such as described previously herein with respect to FIG. 11, according to some embodiments. The DMTC information may be provided on a physical downlink control channel, e.g., using the same component carrier to which the DMTC information relates or using a different component carrier. The DMTC period may include a window of time in which the base station may provide DRS (e.g., CRS or CSI-RS) that the wireless device may perform use for synchronization and RRM measurement purposes.

In 1204, the wireless device may monitor the wireless medium for wireless medium reservation indications. For example, the wireless device may perform Wi-Fi PHY preamble detection, and may determine that the wireless medium is reserved if a Wi-Fi PHY preamble is detected while monitoring the wireless medium. The wireless device may further determine a period of time for which the wireless medium is being reserved, e.g., based on length information included in the Wi-Fi PHY preamble.

In 1206, the wireless device may determine whether the DMTC period overlaps with any wireless medium reservations. For example, a wireless medium reservation associated with a previously detected Wi-Fi PHY preamble might be determined to at least partially overlap with the DMTC period, in some instances. In such an instance, the wireless device may determine that the DMTC period overlaps at least in part with a length of time that the wireless medium is reserved, e.g., based at least in part on the DMTC information and detected Wi-Fi PHY preamble information, and may also determine if there is any portion of the DMTC period when the wireless medium is not reserved.

In 1208, the wireless device may perform RRM measurements during the portion(s) of the DMTC period that is not otherwise reserved. Correspondingly, the wireless device may refrain from performing RRM measurements on the wireless medium during any portions of the DMTC period for which the medium is otherwise occupied.

Note that the method (or method elements) of FIG. 12 may be used independently of and/or in conjunction with the method (or method elements) of FIG. 11, as desired. For example, the downlink control information of the method FIG. 11 may also include the DMTC information of the method of FIG. 12, according to some embodiments. As another example, monitoring the wireless medium for wireless medium reservation indications as performed according to the method of FIG. 12 may occur as part of a LBT procedure such as described further with respect to FIG. 11, according to some embodiments. Alternatively, any or all such method elements may be performed at different times, by different devices, etc., as desired.

Figure 13:
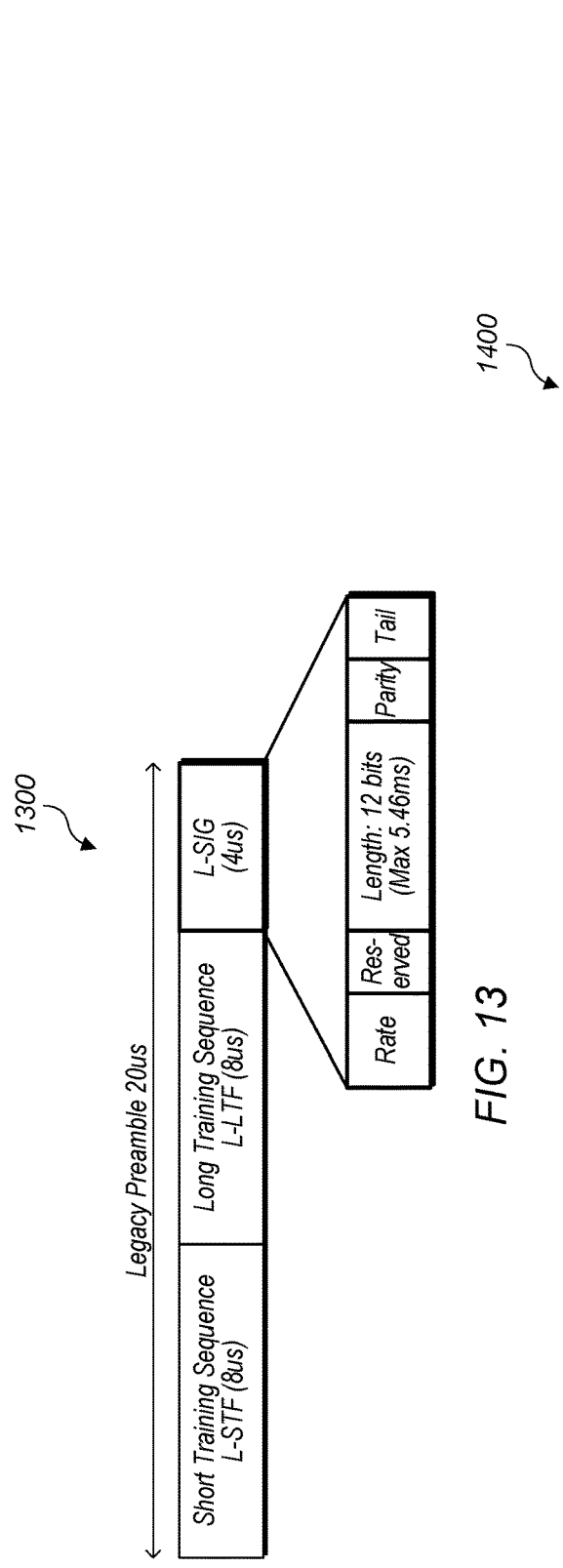
FIGS. 13-14 illustrate exemplary possible Wi-Fi physical layer preambles that could be used in conjunction with LAA uplink communication, according to some embodiments.
Figure 14:
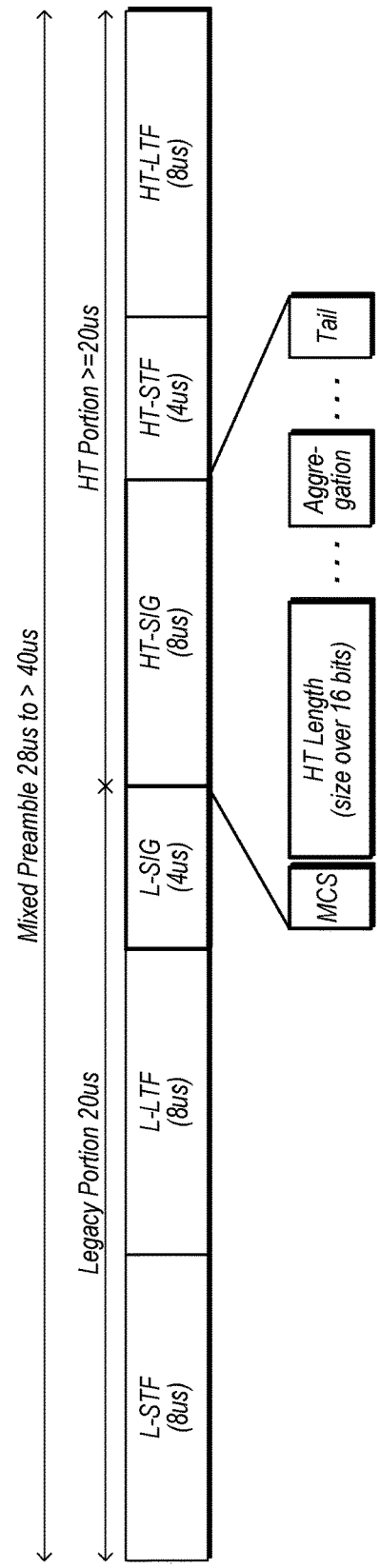

FIGS. 13-14—Wi-Fi Preambles

FIGS. 13-14 illustrate exemplary possible Wi-Fi PHY preambles that can be transmitted as part of LAA uplink communication, e.g., in conjunction with the methods of FIGS. 11-12, according to some embodiments.

FIG. 13 illustrates an exemplary legacy PHY preamble 1300. As shown, the legacy preamble 1300 may include a legacy short training sequence (L-STF), which may occupy 8 μs, a legacy long training sequence (L-LTF), which may occupy 8 μs, and a legacy signaling (L-SIG) field, which may occupy 4 μs. The L-SIG field may include subfields for rate, length, parity, and tail information, as well as a reserved subfield. At least according to some embodiments, such a legacy orthogonal frequency division multiplexing (OFDM) preamble may be sent and detected at the physical layer by all IEEE 802.11 variants operating in the 5 GHz frequency band (e.g., 802.11a, n, ac, ax). Detection of such a preamble may allow Wi-Fi co-channel receivers to synchronize with a transmission that is occurring in the channel, back-off, and sleep until the end of the transmission.

FIG. 14 illustrates an exemplary mixed PHY preamble 1400 including legacy and high throughput portions. As shown, the mixed preamble 1400 may include similar portions as the legacy preamble 1300, including a L-STF, a L-LTF, and a L-SIG field. In addition, the mixed preamble may include a high throughput signaling (HT-SIG) field, which may occupy 8 μs, a high throughput short training field (HT-STF), which may occupy 4 μs, and a high throughput long training field (HT-LTF), which may occupy 8 μs. The HT-SIG field may include subfields for modulation and coding scheme (MCS), length (which may be at least 16 bits), aggregation, and tail information. At least according to some embodiments, such a HT preamble may be detected at the physical layer by at least IEEE 802.11n, 802.11c, and 802.11ax STAs/APs operating in the 5 GHz frequency band. Detection of such a preamble may similarly allow Wi-Fi co-channel receivers to synchronize with a transmission that is occurring in the channel, back-off, and sleep until the end of the transmission, with support for medium reservations beyond 5.46 ms. Note that in the case of such a mixed preamble, the HT-SIG field may override the L-SIG length field, thereby avoiding any potential ambiguity related to differing length values in the HT-SIG field and the L-SIG field. Note also that if desired, it may be possible to truncate the mixed preamble, e.g., after the HT-SIG field, such that the HT-STF and HT-LTF fields are not actually transmitted, in the case of LAA communications. For example, since such fields may relate to Wi-Fi communication and not to the LAA communication, and the length information may be carried in the HT-SIG field, it may be the case that truncating the preamble after the HT-SIG field may have minimal or no negative affect on devices in the communication system, at least according to some embodiments. Thus, the duration of the mixed preamble may be variable from 28 µs to >40 µs, according to some embodiments.

Figure 15:
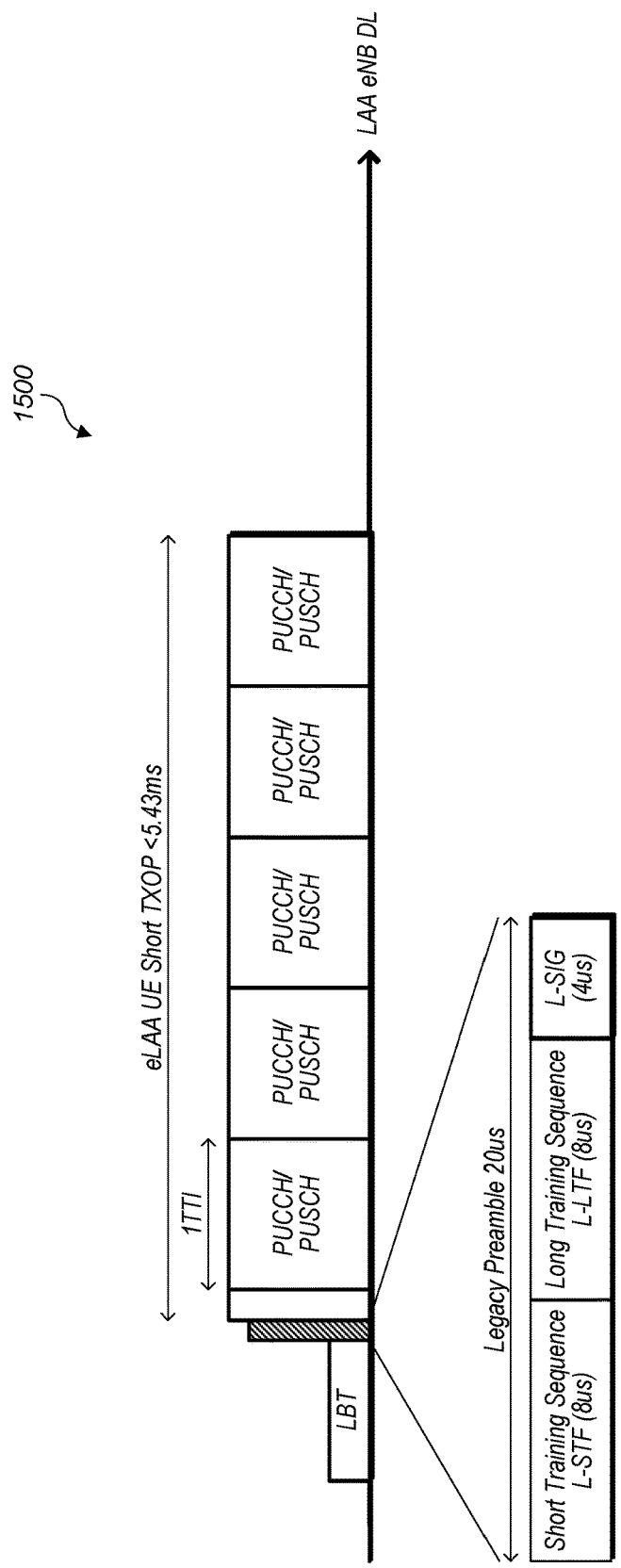
FIGS. 15-16 illustrate exemplary possible LAA uplink communication timelines using the exemplary possible Wi-Fi physical layer preambles of FIGS. 13-14, according to some embodiments.
Figure 16:
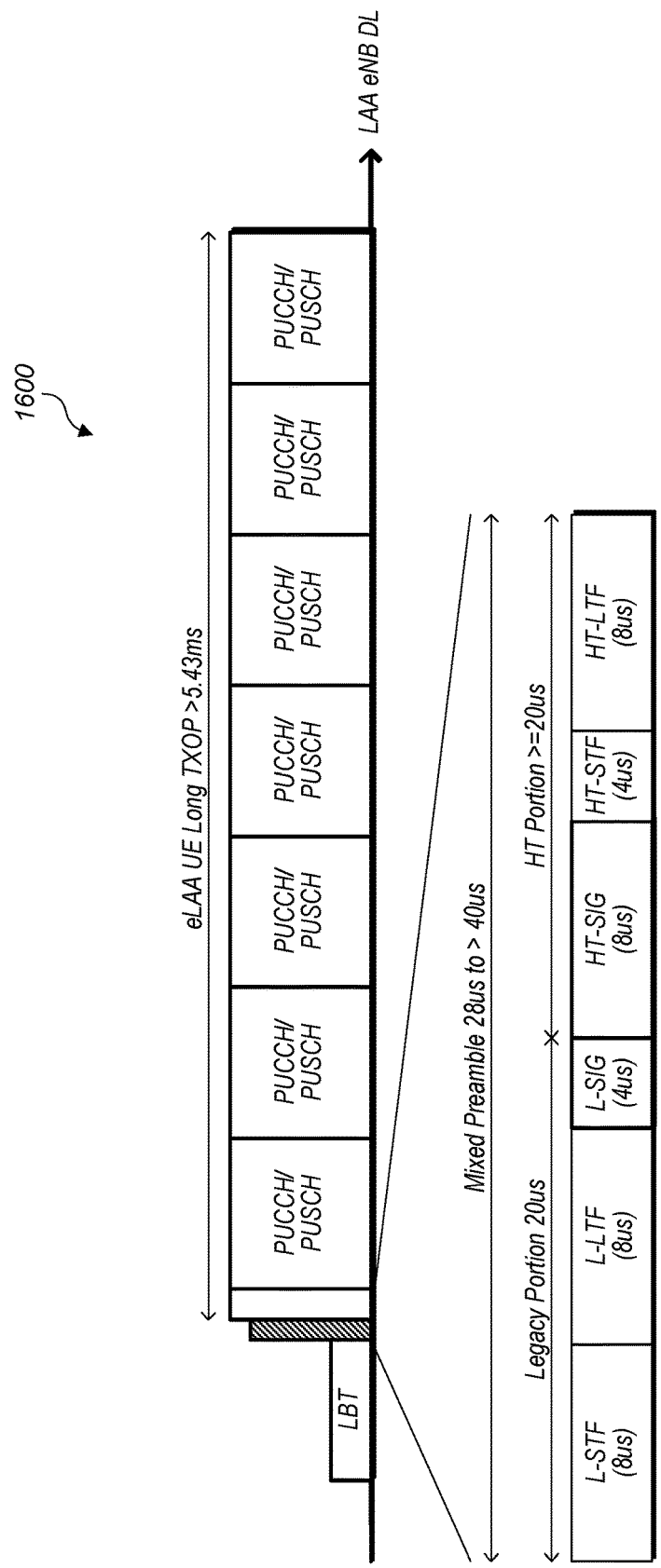

FIGS. 15-16—LAA Communication Timelines

FIGS. 15-16 illustrate exemplary possible communication timelines according to which a wireless device may operate to perform 'enhanced' LAA (eLAA) uplink communication, e.g., in conjunction with the methods of FIGS. 11-12, according to some embodiments.

FIG. 15 illustrates an exemplary timeline 1500 in which a 'short' (e.g., less than 5.43 ms) eLAA uplink transmit opportunity is granted to the wireless device by its serving base station. In this scenario, the wireless device may transmit a (e.g., 20 µs) legacy Wi-Fi PHY preamble in conjunction with the eLAA uplink communication, in which the length of the transmit opportunity may be indicated in the L-SIG field.

FIG. 16 illustrates an exemplary timeline 1600 in which a 'long' (e.g., greater than 5.43 ms) eLAA uplink transmit opportunity is granted to the wireless device by its serving base station. In this scenario, the wireless device may transmit a mixed Wi-Fi PHY preamble in conjunction with the eLAA uplink communication, including a legacy portion and a (e.g., variable length) HT portion, in which the length of the transmit opportunity may be indicated in the HT-SIG field.

Figure 17:
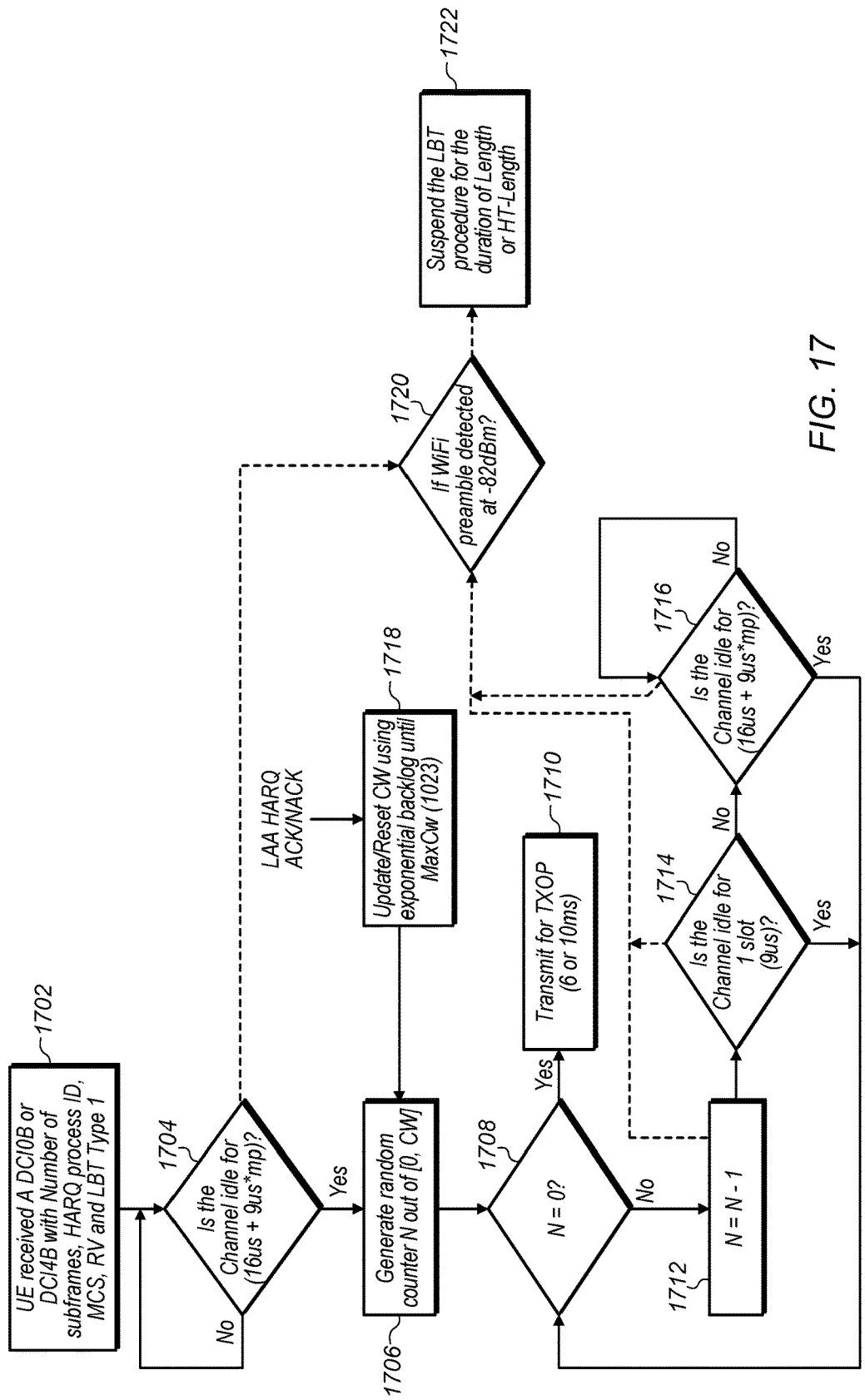
FIG. 17 is a flowchart diagram illustrating aspects of an exemplary possible uplink LBT procedure in which Wi-Fi physical layer preamble detection is supported, according to some embodiments.

FIG. 17—LBT Procedure with Wi-Fi Preamble Detection Support

FIG. 17 shows an exemplary flowchart for a LBT procedure similar to the LBT procedure of FIG. 9, but in which Wi-Fi physical layer preamble detection is additionally supported. Note that while the process shown in FIG. 17 represents one possible LBT procedure, any number of variations on or alternatives to the procedure of FIG. 17 are also possible. For example, while the LBT procedure of FIG. 17 is directed to a UE device performing an LBT procedure, a base station (e.g., eNB) may also or alternatively perform an LBT procedure in certain circumstances. In general, a LBT procedure may be used to help avoid causing collisions on a shared wireless medium, by monitoring the wireless medium to determine if any transmissions are already ongoing, and refraining from transmitting if a transmission is determined to already be in progress.

As shown, in 1702, initially a UE device may receive downlink control information indicating an uplink transmit opportunity for the UE device. For example, the UE device may receive a DCI0B or DCI4B indicating configuration information for the uplink TXOP, such as information indicating a number of subframes, a hybrid automatic repeat request (HARD) process ID, a modulation and coding scheme, redundancy version information, LBT procedure type, etc. The UE may determine that to perform a LBT procedure based on the configuration information and/or based on the uplink TXOP being for a shared wireless medium (e.g., the 5 GHz unlicensed band, as one possibility).

In 1704, the UE may monitor the wireless medium for availability, to determine whether the channel is idle for a predetermined period of time continuously. The length of time may depend on a type (e.g., priority level) of traffic to be transmitted. For example, different lengths of time may be used for some or all of voice, video, best effort, and background traffic, according to some embodiments. In the exemplary illustrated scenario of FIG. 17, the period of time may include a base length of 16 microseconds plus a variable length of 9 microseconds multiplied by a factor selected based on the traffic type. As an example, the period of time might be 43 µs (e.g., 16+9*3) for best effort traffic, according to some embodiments. Other values (and algorithms for determining values) for the predetermined period of time may also or alternatively be used, as desired.

If the wireless medium is not available for the predetermined period of time continuously (e.g., if the wireless medium is busy or becomes busy before the predetermined period of time expires, as may be detected based on the energy level detected on the wireless medium), the UE may continue to monitor the wireless medium until such a time as the wireless medium does become idle for the predetermined period of time continuously, at which time the method may proceed to step 1706. Alternatively, the method may proceed to step 1720 if the wireless medium is determined to be busy as a result of detection of a Wi-Fi preamble at a sufficient signal strength (e.g., −82 dBm, as shown, or any other desired threshold value). In this case, in 1722, the LBT procedure may be suspended for the duration indicated in the Wi-Fi preamble (e.g., in the length or HT-length subfield of the Wi-Fi preamble), following which the method may return to step 1704 to continue monitoring the wireless medium for availability until such a time as the wireless medium does become idle for the predetermined period of time continuously, at which time the method may similarly proceed to step 1706.

In 1706, the UE may generate a random counter N with a value within a specified contention window (CW) range, e.g., between 0 and a predetermined maximum possible value CW. Note that the method may also proceed to step 1706 to perform a LBT procedure from step 1718, in which the contention window may be updated or reset using an exponential backog until a maximum contention window, e.g., based on LAA HARQ ACK/NACK information.

In 1708, it may be determined if the counter N is equal to 0. If yes, the method may proceed to step 1710, in which the UE may proceed to transmit for its transmission opportunity (e.g., 6 or 10 milliseconds, among various possibilities). If the counter N is not equal to 0, the method may proceed to step 1712, in which the counter N may be reduced by 1.

In 1714, it may be determined if the wireless medium remains idle for 1 Wi-Fi slot (e.g., 9 µs). If it is determined not to be idle as a result of energy sensing, the method may proceed to step 1716, in which the UE may again monitor the wireless medium for availability (e.g., in a similar manner as in step 1704), to determine whether the channel is idle for the predetermined period of time continuously. The UE may repeat this step as needed until the channel is idle for the predetermined period of time continuously.

Note that if while monitoring the wireless medium during step 1714 and/or step 1716, a Wi-Fi preamble is detected, the method may proceed to step 1720. In this case, in 1722, the LBT procedure may be suspended for the duration indicated in the Wi-Fi preamble, following which the method may return to step 1716 to continue monitoring the wireless medium for availability until such a time as the wireless medium does become idle for the predetermined period of time continuously (i.e., a 'yes' result from step 1716).

If the result of step 1714 or step 1716 is 'yes', the method may return to step 1708, in which it may be determined if the counter N is now equal to 0. As previously noted, once the counter N is equal to 0, the method may proceed to step 1710, in which the UE may proceed to transmit for its transmission opportunity. Otherwise, the method may repeat its countdown of the counter N when the wireless medium is idle according to the illustrated procedure.

In the following further exemplary embodiments are provided.

One set of embodiments may include a method, comprising, by a wireless device: receiving downlink control information from a cellular base station, wherein the downlink control information indicates an uplink transmit opportunity for license assisted access (LAA) communication for the wireless device; determining a length of the uplink transmit opportunity; and performing LAA uplink communication during the uplink transmit opportunity, wherein performing LAA uplink communication comprises transmitting a Wi-Fi physical layer preamble, wherein a type of the Wi-Fi physical layer preamble transmitted by the wireless device is based at least in part on the length of the uplink transmit opportunity.

According to some embodiments, the type of the Wi-Fi physical layer preamble comprises a legacy Wi-Fi physical layer preamble if the length of the uplink transmit opportunity is less than a transmission length threshold.

According to some embodiments, the type of the Wi-Fi physical layer preamble comprises a high throughput (HT) Wi-Fi physical layer preamble if the length of the uplink transmit opportunity is greater than a transmission length threshold.

According to some embodiments, the method further comprises: performing a listen-before-talk (LBT) procedure to determine whether a wireless medium is available for the LAA communication, wherein the LBT procedure comprises performing energy detection and Wi-Fi physical layer preamble detection on the wireless medium.

According to some embodiments, the method further comprises: detecting a Wi-Fi physical layer preamble during the LBT procedure; and suspending the LBT procedure for a duration indicated by the Wi-Fi physical layer preamble based on detecting the Wi-Fi physical layer preamble during the LBT procedure.

According to some embodiments, the method further comprises: receiving discovery reference signal (DRS) measurement timing configuration (DMTC) information from the cellular base station, wherein the DMTC information indicates a DMTC period for performing radio resource management (RRM) measurements on a wireless medium; decoding a Wi-Fi physical layer preamble, wherein the Wi-Fi physical layer preamble indicates a length of time that the wireless medium is reserved; determining that the DMTC period overlaps at least in part with the length of time that the wireless medium is reserved based at least in part on the DMTC information and the Wi-Fi physical layer preamble; determining a time window within the DMTC period when the wireless medium is not reserved; and performing the RRM measurements on the wireless medium during the time window within the DMTC period when the wireless medium is not reserved.

According to some embodiments, RRM measurements are not performed on the wireless medium during the length of time window that the wireless medium is reserved.

Another set of embodiments may include a method, comprising: by a wireless device: receiving discovery reference signal (DRS) measurement timing configuration (DMTC) information from a cellular base station, wherein the DMTC information indicates a DMTC period for performing radio resource management (RRM) measurements on a wireless medium; decoding a Wi-Fi physical layer preamble, wherein the Wi-Fi physical layer preamble indicates a length of time that the wireless medium is reserved; determining that the DMTC period overlaps at least in part with the length of time that the wireless medium is reserved based at least in part on the DMTC information and the Wi-Fi physical layer preamble; determining a time window within the DMTC period when the wireless medium is not reserved; and performing the RRM measurements on the wireless medium during the time window within the DMTC period when the wireless medium is not reserved.

A further set of embodiments may include a method, comprising: by a wireless device: receiving downlink control information from a cellular base station, wherein the downlink control information indicates an uplink transmit opportunity for license assisted access (LAA) communication for the wireless device; and performing LAA uplink communication during the uplink transmit opportunity, wherein performing LAA uplink communication comprises transmitting a Wi-Fi physical layer preamble that indicates an amount of time that a wireless medium on which the LAA uplink communication is performed is reserved.

A still further exemplary set of embodiments may include an apparatus, comprising a processing element configured to cause a device to implement any or all parts of the preceding examples.

Another exemplary set of embodiments may include a wireless device, comprising: an antenna; a radio coupled to the antenna; and a processing element operably coupled to the radio, wherein the device is configured to implement any or all parts of the preceding examples.

A yet further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a wireless device:
receiving downlink control information from a cellular base station, wherein the downlink control information indicates an uplink transmit opportunity for cellular communication in an unlicensed band for the wireless device;
determining a remaining length of time of the uplink transmit opportunity;
performing cellular uplink communication in the unlicensed band during the uplink transmit opportunity, wherein performing the cellular uplink communication in the unlicensed band comprises transmitting a Wi-Fi physical layer preamble, wherein a type of the Wi-Fi physical layer preamble transmitted by the wireless device is based at least in part on the remaining length of time of the uplink transmit opportunity.

2. The method of claim 1,
wherein the type of the Wi-Fi physical layer preamble comprises a legacy Wi-Fi physical layer preamble if the remaining length of time of the uplink transmit opportunity is less than a transmission length threshold.

3. The method of claim 1,
wherein the type of the Wi-Fi physical layer preamble comprises a high throughput (HT) Wi-Fi physical layer preamble if the remaining length of time of the uplink transmit opportunity is greater than a transmission length threshold.

4. The method of claim 1, further comprising:
performing a listen-before-talk (LBT) procedure to determine whether a wireless medium is available for the cellular communication in the unlicensed band, wherein the LBT procedure comprises performing energy detection and Wi-Fi physical layer preamble detection on the wireless medium.

5. The method of claim 4, wherein the method further comprises:
detecting a Wi-Fi physical layer preamble during the LBT procedure; and
suspending the LBT procedure for a duration indicated by the Wi-Fi physical layer preamble based on detecting the Wi-Fi physical layer preamble during the LBT procedure.

6. An apparatus, comprising:
a non-transitory memory medium comprising program instructions; and
a processor configured to execute the program instructions to cause a wireless device to:
receive downlink control information from a cellular base station, wherein the downlink control information indicates an uplink transmit opportunity for cellular communication on a wireless medium comprised in an unlicensed frequency band;
determine a remaining length of time of the uplink transmit opportunity;
select a type of Wi-Fi physical layer preamble based on the remaining length of time; and
perform uplink communication on the wireless medium during the uplink transmit opportunity, wherein the uplink communication on the wireless medium comprises transmission of a Wi-Fi physical layer preamble of the selected type that indicates an amount of time that the wireless medium is reserved and cellular uplink communication with the cellular base station.

7. The apparatus of claim 6, wherein the type of Wi-Fi physical layer preamble is selected from at least two possible types of Wi-Fi physical layer preamble.

8. The apparatus of claim 6,
wherein the type of Wi-Fi physical layer preamble is selected from one of a legacy Wi-Fi physical layer preamble or a high throughput (HT) Wi-Fi physical layer preamble.

9. The apparatus of claim 6, wherein the processor is further configured to cause the wireless device to:
perform a listen-before-talk (LBT) procedure to determine whether the wireless medium is available for the uplink communication prior to transmission of the Wi-Fi physical layer preamble, wherein the LBT procedure comprises energy detection and Wi-Fi physical layer preamble detection on the wireless medium.

10. The apparatus of claim 9, wherein the processor is further configured to cause the wireless device to:
detect a Wi-Fi physical layer preamble during the LBT procedure;
suspend the LBT procedure for a duration indicated by the detected Wi-Fi physical layer preamble; and
resume the LBT procedure after the duration indicated by the detected Wi-Fi physical layer preamble.

11. The apparatus of claim 6,
wherein the uplink communication comprises licensed assisted access (LAA) communication.

12. A wireless device, comprising:
a radio; and
a processor operably coupled to the radio and configured to cause the wireless device to:
receive downlink control information from a base station, wherein the downlink control information indicates an uplink transmit opportunity for communication on a wireless medium comprised in an unlicensed frequency band;
determine a remaining duration in time of the uplink transmit opportunity;
select a type of wireless local area network (WLAN) physical layer preamble based on the remaining duration in time; and
transmit a WLAN physical layer preamble of the selected type that reserves the wireless medium and indicates an amount of time that the wireless medium is reserved.

13. The wireless device of claim 12, wherein the selected type is a legacy preamble type if the remaining duration in time is less than a threshold.

14. The wireless device of claim 12, wherein the selected type is a high throughput preamble type if the remaining duration in time is more than a threshold.

15. The wireless device of claim 12, wherein the processor is further configured to cause the wireless device to:
perform a listen-before-talk (LBT) procedure during the uplink transmit opportunity, wherein the remaining duration in time of the uplink transmit opportunity is based on subtracting an amount of time of the LBT procedure from an initially granted duration of the uplink transmit opportunity.

16. The wireless device of claim 15, wherein the processor is further configured to cause the wireless device to:
detect a second WLAN physical layer preamble during the LBT procedure; and
suspend the LBT procedure for a duration indicated by the second WLAN physical layer preamble, wherein the amount of time of the LBT procedure includes the duration indicated by the second WLAN physical layer preamble.

17. The wireless device of claim 15, wherein the LBT procedure includes performing energy detection and WLAN physical layer preamble detection on the wireless medium.

18. The wireless device of claim 12, wherein the transmission of the WLAN physical layer preamble of the selected type reserves the wireless medium for licensed assisted access (LAA) communication.

19. The wireless device of claim 17, wherein the base station is a cellular base station, wherein the processor is further configured to cause the wireless device to:
transmit data to the base station during the amount of time that the wireless medium is reserved.

20. The wireless device of claim 12, wherein the type of WLAN physical layer preamble is selected from at least a first type and a second type, wherein each of the first type and the second type comprise a length field, wherein the number of bits of the length field of the first type is different than the number of bits of the length field of the second type.

* * * * *